May 10, 1960  V. P. PETRONOVICH  2,935,901
REVERSIBLE MARINE TRANSMISSION
Filed March 13, 1959  3 Sheets-Sheet 1
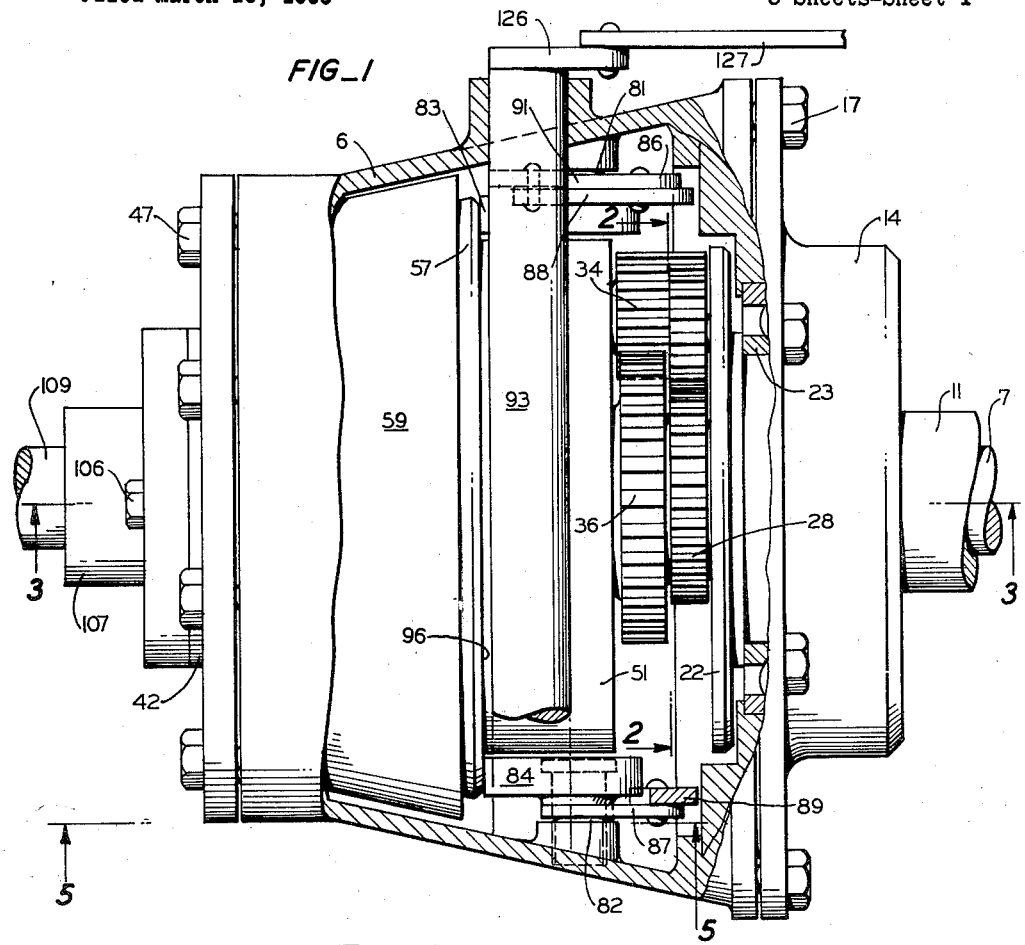
FIG_1
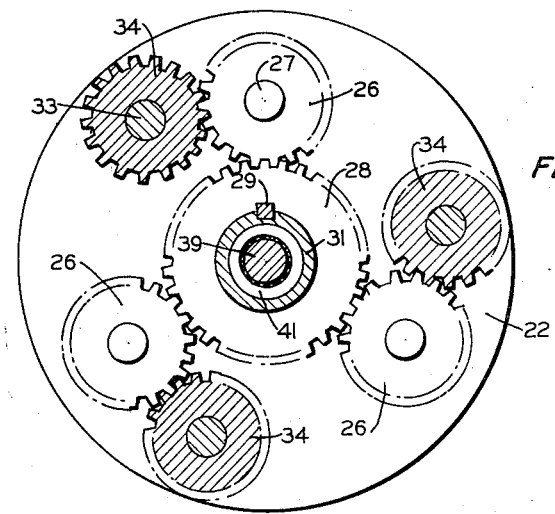
FIG_2
INVENTOR.
VINCENT P. PETRONOVICH
BY
*Lothrop & West*
ATTORNEYS

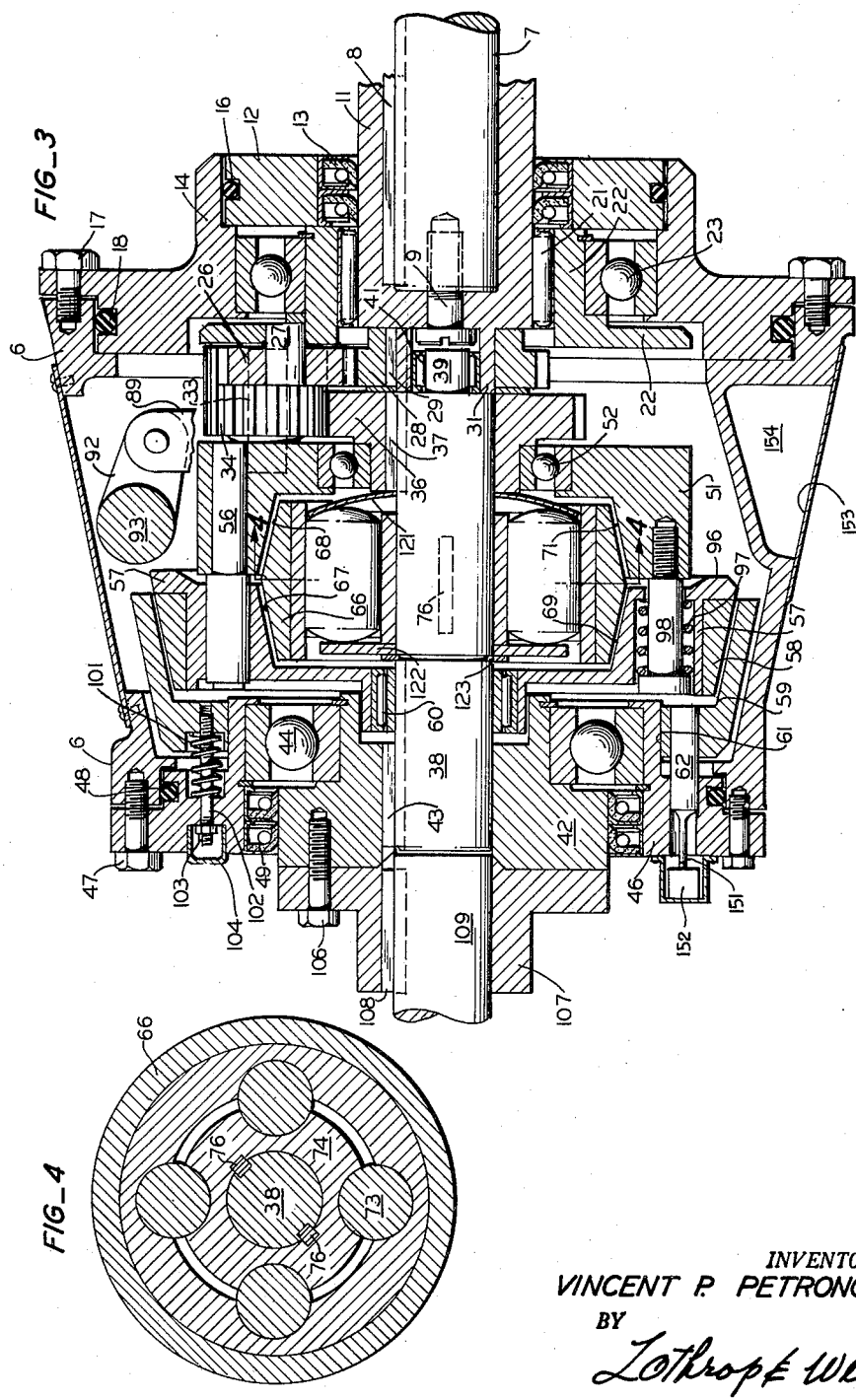

May 10, 1960 V. P. PETRONOVICH 2,935,901
REVERSIBLE MARINE TRANSMISSION
Filed March 13, 1959 3 Sheets-Sheet 3
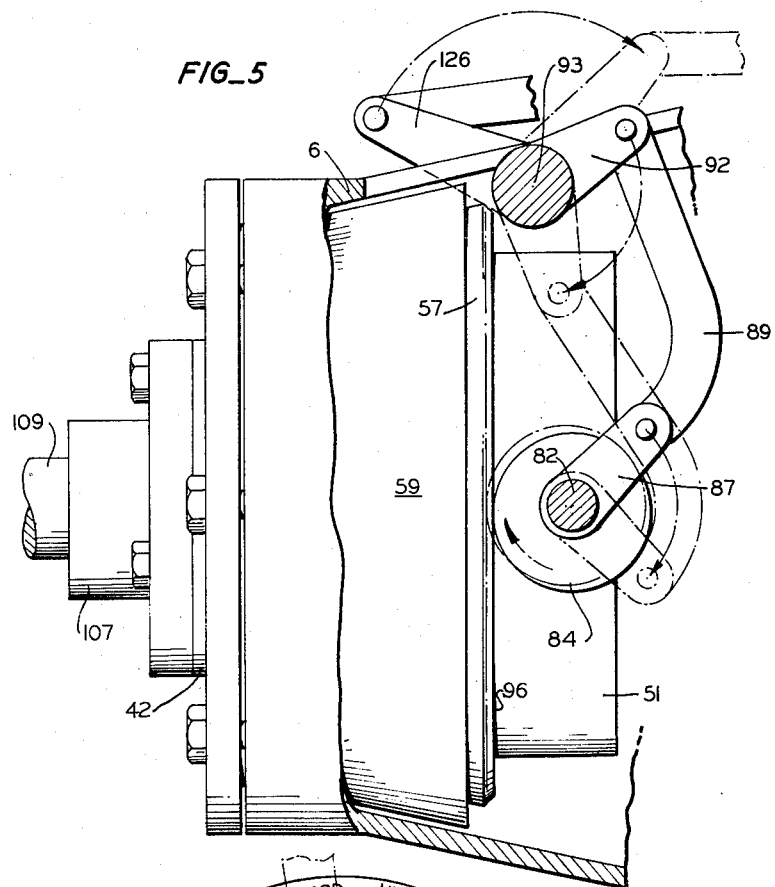
FIG_5
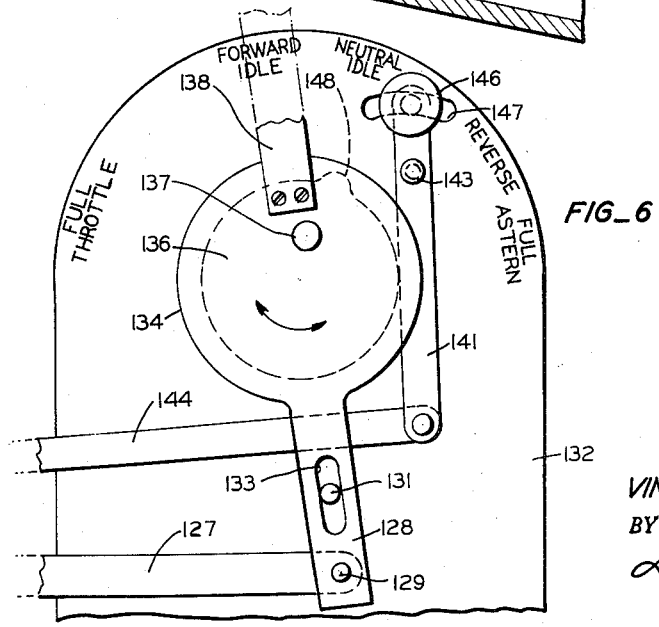
FIG_6
INVENTOR.
VINCENT P. PETRONOVICH
BY
Lothrop & West
ATTORNEYS United States Patent Office 2,935,901
Patented May 10, 1960

2,935,901

REVERSIBLE MARINE TRANSMISSION

Vincent P. Petronovich, San Mateo, Calif.

Application March 13, 1959, Serial No. 799,213

6 Claims. (Cl. 74—792)

My invention relates to means primarily useful for employment in marine craft for connecting the source of power such as as a unidirectional, internal combustion engine with the propeller shaft, the transmission being capable of affording a forward, neutral and reverse interconnection between the rotating parts.

Marine transmissions with a reverse gear are well known but many of them require a good deal of service attention for continued uniform operation. Others are erratic, depending on various conditions of operation. In addition, some of them are not as reliable over a period of time as is desired and some of them are expensive to construct and maintain.

It is therefore an object of my invention to provide an improved reversible marine transmission which is relatively simple and inexpensive to construct and maintain, which is consistent and uniform in its operation over a long period of time, which gives a reliable and effective forward connection or reverse connection and a free neutral position, and is smoothly responsive to manual control.

Another object of the invention is, in general, to improve reversible marine transmissions.

Other objects, together with the foregoing, are attained in the embodiment of the invention described in the accompanying description and illustrated in the accompanying drawings, in which:

Figure 1 is a top plan view of a transmission constructed pursuant to the invention, with a portion of the outer housing broken away to disclose the interior construction and certain parts being shown in cross-section.

Figure 2 is a diagrammatic cross-section, the plane of which is indicated by the line 2—2 of Figure 1.

Figure 3 is a cross-section on a vertical, longitudinal plane indicated by the line 3—3 of Figure 1.

Figure 4 is a detailed, diagrammatic cross-section, the plane of which is indicated by the line 4—4 of Figure 3.

Figure 5 is a side elevation of the housing, with portions being broken away to disclose the interior on a cross-sectional plane indicated by the line 5—5 of Figure 1 and illustrating part of the control mechanism.

Figure 6 is a side elevation of a control device for use with the structure of Figure 5.

While the reversible marine transmission pursuant to the invention can be incorporated in a number of variant ways, it has successfully been built and operated substantially in the form shown herein. In this arrangement, there is provided a main housing 6 conveniently of cast metal and provided with any sort of mounting or fastening arrangements to relate it to an internal combustion engine (not shown) and also to relate it to a driven mechanism (not shown).

The housing 6 is made up of a number of parts and is designed to be situated approximately coaxially with a driving shaft 7 which extends from the engine. Surrounding the driving shaft and secured thereto, not only by a key 8 but also by an end screw 9, is a driver 11. This is in the form of an adaptor so that driving shafts 7 of different diameters and configurations can readily be accommodated without otherwise altering the transmission. The driver 11 enters the housing 6 through a closure disk 12 carrying suitable lubricant seals 13 thereon and itself mounted within an end closure plate 14. An O ring 16 precludes leakage between the disk 12 and the plate 14 and the disk is preferably kept from rotation with respect to the plate and is held in position by suitable fasteners (not shown). The end closure plate 14 is related to the housing 6 by suitable removable fasteners 17, there being an O ring seal 18 to preclude lubricant leakage therebetween. The driver 11 is centered by means of a needle bearing 21 running in part of a planetary spider 22 having a hub disposed within the inner race of an anti-friction bearing 23 pressed into the end plate 14, so that indirectly the driver 11 is carried by the end plate 14.

At appropriate intervals, as especially shown in Figure 2, the spider 22 carries a suitable number of first planet gears 26 mounted on journal pins 27 and meshing with a sun gear 28 secured by a key 29 to the reduced forward end 31 of the driver 11. Also mounted on suitable journal pins 33 projecting from the spider 22 are second planet gears 34. These not only mesh with adjacent ones of the first planet gears 26 but also are in mesh with a second sun gear 36 secured by a key 37 to a driven shaft 38.

The driven shaft 38 and the driver 11 are coaxial. The driven shaft at its forward end has a pilot portion 39 journalled in a needle bearing 41 carried in the reduced forward end 31 of the driver 11. The driven shaft 38 also carries a connector 42 secured for rotation with the shaft by a key 43 and mounted in an anti-friction bearing 44. The outer race of the bearing 44 is in a rear end plate 46 mounted in the housing 6 and removably secured by fasteners 47, there being an O ring seal 48 to preclude lubricant leakage. Grease seals 49 prevent leakage between the plate 46 and the connector 42.

Designed to run in unison with and coaxially with the planetary spider 22 is a first clutch cone 51. This is mounted on an anti-friction bearing 52 running on the hub of the second sun gear 36 and is joined to the spider 22 by means of the journal pins 27 and 33 so that the entire planetary spider and first clutch cone rotate together. The first clutch cone 51 is so mounted that it is not axially movable.

Projecting parallel to the axis from the first clutch cone are shoulder pins 56 carrying a second clutch cone 57 freely slidable thereon. The second clutch cone is also centered with respect to the driven shaft 38 by a needle bearing 60, permitting the slight axial movement desired. The second clutch cone 57, around its periphery, is provided with an external brake cone 58 conveniently fabricated of replaceable anti-friction material. The cone 58 is designed when shifted to engage an internal brake cone 59 centered and slidably mounted on the hub 61 of the end plate 46. While the internal brake cone 59 is axially slidable, it is held non-rotatable by pins 62 slidably mounted within the end plate 46.

Within the confines of the internal spaced defined by the first and second clutch cones 51 and 57, there is provided a clutch ring 66 conveniently of suitable anti-friction material. The ring 66 is provided with opposite bevels 67 and 68 on its outer periphery to match the internal configurations 69 and 71 of the first and second clutch cones. The clutch ring 66, as especially shown in Figure 4, is internally contoured partially to encompass and to slide upon driving pins 73. These are also partially encompassed and slidably engaged by an inner ring 74 secured to the driven shaft 38 by a pair of keys 76.

Within and disposed on opposite sides of the housing 6 in alignment with each other are stub shafts 81 and 82 having eccentric portions on which rollers 83 and 84 are mounted. The rollers are joined to levers 86 and 87 operated in unison by links 88 and 89 joined also to levers 91 and 92. These project from a control shaft 93 journalled in the housing 6. When the shaft 93 is in its neutral or intermediate position, the rollers 83 and 84 bear against an actuating face 96 on the second clutch cone 57 in such a way as to hold that cone in an intermediate, neutral position. The cone is then not in frictional engagement with anything.

When the shaft 93 is rotated so as to cause the rollers 83 and 84 to displace the second clutch cone 57 to the left, as seen in Figure 3, the second clutch cone is moved against the urgency of springs 97 disposed within the second clutch cone. The springs surround studs 98 having enlarged heads abutting the springs and mounted in the first clutch cone 51. The springs 97 are thus compressed while the second clutch cone is displaced to the left until such time as the friction surface of the cone 58 comes into firm engagement with the internal brake cone 59.

While the internal brake cone can be made as a rigid part of the housing 6, it is preferred to have it axially floating although held against rotation, as shown. Thus, the initial engagement of the external brake cone with the internal brake cone causes some leftward displacement of the external brake cone against coil springs 101. These surround pins 102 seated in the external brake cone and extending through the end plate 46. Adjusting nuts 103 on the end of the pins 102 normally protected by a cap 104, limit the right-hand axial displacement of the internal brake cone while the strength of the springs 101 establishes the amount of yielding pressure that may be exerted between the internal and external brake cones. If the leftward displacement of the external brake cone 58 is sufficient, the cone comes into mechanical abutment with the end of the housing 6. There is no further yielding and any amount of braking friction is thereafter available.

When the internal and external brake cones are in firm engagement, the first and second clutch cones 51 and 57 are likewise held stationary, as is the planetary spider 22. Under these conditions, the driver 11 rotates the sun gear 28. Likewise, the first and second planet gears 26 and 34 are similarly rotated and drive the second sun gear 36. Since this is keyed to the driven shaft 38, the connector 52 is revolved. This normally is secured by bolts 106 to a suitable flange coupling 107 secured by a key 108 to the propeller shaft 109. Under these circumstances, the propeller shaft 109 is driven in the reverse sense from the rotation of the driving shaft 7.

When the control shaft 93 is moved in the opposite direction so that the rollers 83 and 84 tend to back away from the engaging surface 96, the previously compressed springs 97 drive the second clutch cone 57 to the right, thus disengaging the external brake cone from the internal brake cone 59 after it is stopped by the adjusting nuts 103. The mechanism is thus again in neutral position and no drive is accomplished since under these circumstances the entire planetary mechanism is able to revolve freely about the rotational axis of the driving and driven members.

When the rollers 83 and 84 are further retracted, the springs 97 translate the second clutch cone 57 even farther to the right toward the first clutch cone 51. The springs then act to cause abutment of the internal conical surfaces 67 and 68 with the external conical surfaces 69 and 71. During this time, the clutch ring 66 moves slightly to the right along its axis until all of the various frictional surfaces 67, 68, 69 and 71 are in firm abutment. When this occurs, the planetary spider 22 is, in effect, locked to the driven shaft 38 so that the driver and the driven shaft move in the forward sense and in unison.

Again, when the rollers 83 and 84 are returned toward central position, the internal clutches are disengaged. This return movement is assisted by a dished spring 121 which tends to drive the pins 73 back against a thrust plate 122 secured by a snap ring 123 on the driven shaft so that the parts are yieldingly restored to their neutral location.

As an effective adjunct to the marine transmission, particularly when it is installed with an internal combustion engine having a throttle or other speed governing means, the shaft 93 is provided with a lever 126 connected by a link 127 to an eccentric strap arm 128 by means of a pivot pin 129. A fulcrum pin 131 projects from a mounting plate 132 and operates in a slot 133 within the extension 128. The eccentric strap 134 surrounds an eccentric 136 rotatably mounted on a shaft 137 projecting from the mounting plate 132. A handle lever 138 extends to any convenient point for operation. When the handle is rocked between a central position, a left-hand extreme position and a right-hand extreme position, as seen in Figure 6, the eccentric 136 is rotated about the pin 137 as a center and the eccentric strap 134 is similarly moved. The vertical component of this motion is substantially nullified by the slot 133 but the transverse component is primarily effective upon the link 127. Upon movement of the handle lever 138, the shaft 93 is rotated to control the transmission; that is, to put it into forward position, neutral position or reverse position.

Simultaneously with this operation, the eccentric 136 bears against a lever 141 mounted on the plate 132 by means of a pin 143 and connected by a strap 144 with the engine controller, such as a carburetor throttle. To hold the lever 141 in any selected position, there is provided a releasable thumbnut 146 which not only engages the lever but can be frictionally tightened onto the margins of a slot 147 in the plate 132. It is contemplated that the nut 146 will be tightened only when the lever 138 is not in use. Normally, the nut 146 is loose and the lever 141 can swing freely. Since in some instances it is desired to have an especially effective operation of the lever 141, the eccentric 136 is supplemented by a cam 148 which also bears against the lever 141 and gives an extra throttle opening.

An extension 151 on one of the pins 62 actuates an electric switch 152 when the brake cone 59 is shifted, so as to give an indication of reverse operation. A jacket cover 153 encloses a volume 154 that can be suitably connected to a supply of circulating coolant.

Pursuant to the disclosure herein, the present invention constitutes a substantial improvement in marine reversing gears. The device although particularly characterized as a marine reversing gear is susceptible to installation in other environments in which similar operating characteristics are beneficial.

What is claimed is:

1. In a planetary transmission having a housing, a planet spider journalled in said housing, and a driven shaft journalled in said housing, the combination of a first clutch cone journalled on said driven shaft and held against sliding thereon, means for fastening said first clutch cone and said planet spider for rotation in unison, a second clutch cone, means for mounting said second clutch cone for rotation and sliding movement on said driven shaft, means for connecting said second clutch cone and said first clutch cone for rotation in unison and for relative sliding movement, an external brake cone forming part of said second clutch cone, an internal brake cone fixed against rotation with respect to said housing, a clutch ring having opposite bevels on the outer periphery thereof, means for mounting said clutch ring on said driven shaft for axial movement but against rotation relative to said driven shaft, and means on said housing for shifting said second clutch cone axially between a first position with said external brake cone in engagement with said internal brake cone and a second position with said first and second clutch cones in engagement with respective ones of said opposite bevels on said clutch ring.

2. In a planetary transmission having a housing, a planet spider journalled in said housing, and a driven shaft journalled in said housing, the combination of a first clutch cone journalled on said driven shaft, means for fastening said first clutch cone and said planet spider for rotation in unison, a second clutch cone, means for mounting said second clutch cone for rotation and sliding movement on said driven shaft, means for connecting said second clutch cone and said first clutch cone for rotation in unison and for relative sliding movement, an external brake cone forming part of said second clutch cone, an internal brake cone axially slidable but fixed against rotation with respect to said housing, means for yieldingly opposing slidable movement of said internal brake cone in one direction, means for limiting slidable movement of said internal brake cone in the opposite direction, a clutch ring having opposite bevels on the outer periphery thereof, means for mounting said clutch ring on said driven shaft for axial movement but against rotation relative to said driven shaft, and means for shifting said second clutch cone axially in one direction to engage said external brake cone with said internal brake cone and in the other direction to engage one of said bevels on said clutch ring and to shift said clutch ring to engage the other of said bevels with said first clutch cone.

3. In a planetary transmission having a housing, a planet spider journalled in said housing, and a driven shaft journalled in said housing, the combination of a first clutch cone journalled on said driven shaft, means for fastening said first clutch cone and said planet spider for rotation in unison and against axial movement, a second clutch cone, means for mounting said second clutch cone for rotation and sliding movement on said driven shaft, means for connecting said second clutch cone and said first clutch cone for rotation in unison and for relative sliding movement, an external brake cone, means for connecting said external brake cone for rotation in unison with said first and second clutch cones, an internal brake cone fixed against rotation with respect to said housing, a clutch ring having opposite bevels on the periphery thereof, means for fixing said clutch ring on said driven shaft against rotation relative to said driven shaft but for sliding movement relative thereto, and means on said housing for shifting said second clutch cone axially between a first position with said external brake cone in engagement with said internal brake cone and a second position with said first and second clutch cones in engagement with respective ones of said bevels on said clutch ring.

4. A transmission comprising a housing, a planetary gear assembly disposed within said housing, a driven shaft journalled in said housing, means for fixing one of the elements of said assembly to said driven shaft, a first clutch cone journalled on said driven shaft, means for fixing another of the elements of said assembly to said first clutch cone, a clutch ring, means for mounting said clutch ring on said driven shaft for axial movement but against rotation relative to said driven shaft, a brake cone, means for holding said brake cone against rotation relative to said housing, and means effective in one position for coupling frictionally said first clutch cone to said brake cone and another position to shift said clutch ring axially into frictional engagement with said first clutch cone for coupling said first clutch cone and said clutch ring.

5. A transmission comprising a housing, a driven shaft journalled in said housing, a planetary gear assembly disposed within said housing, means for fixing one of the elements of said assembly to said driven shaft, a first clutch member having a friction surface, means for fixing another of the elements of said assembly to said first clutch member, a clutch ring having a pair of friction surfaces, means for mounting said clutch ring on said driven shaft for axial movement but against rotation relative said said driven shaft, a brake member on said housing and having a friction surface, and means axially movable on said driven shaft and coupled to said first clutch member for rotation therewith and effective in one axial position frictionally to engage the friction surface of said brake member and effective in another axial position frictionally to engage one of the friction surfaces on said clutch ring as well as to displace said clutch ring axially to engage the other of the friction surfaces on said clutch ring with the friction surface of said first clutch member.

6. In a planetary transmission having a housing, a planet spider journalled in said housing and a driven shaft journalled in said housing the combination of a first clutch cone journalled on said driven shaft and held against axial movement thereon, means for fastening said first clutch cone and said planet spider for rotation in unison, a second clutch cone, means for mounting said second clutch cone for rotation and sliding movement on said driven shaft, means for connecting said second clutch cone and said first clutch cone for rotation in unison and for relative sliding movement, an internal brake cone mounted on and fixed against rotation relative to said housing, an internal brake cone fixed on said second clutch cone, a clutch ring having friction bevels thereon, means for mounting said clutch ring on said driven shaft between said first clutch cone and said second clutch cone, means for fastening said clutch ring to said driven shaft for sliding movement thereon and against rotation relative thereto, first spring means for urging said clutch ring to slide away from said first clutch cone, and second spring means for urging said second clutch cone toward said clutch ring and for urging said clutch ring toward said first clutch cone despite the urgency of said first spring means.

References Cited in the file of this patent

UNITED STATES PATENTS

| 793,224 | Perkins | June 27, 1905 |
| 1,328,145 | Foster | Jan. 13, 1920 |
| 1,395,840 | Lavoie | Nov. 1, 1921 |
| 2,488,756 | Baker | Nov. 22, 1949 |
| 2,867,136 | Albinson et al. | Jan. 6, 1959 |